A. S. HOWELL.
CONTROL MEANS FOR MOTION PICTURE PRINTING MACHINES.
APPLICATION FILED APR. 22, 1915.

1,225,335.

Patented May 8, 1917.
8 SHEETS—SHEET 1.

A. S. HOWELL.
CONTROL MEANS FOR MOTION PICTURE PRINTING MACHINES.
APPLICATION FILED APR. 22, 1915.

1,225,335.

Patented May 8, 1917.
8 SHEETS—SHEET 3.

A. S. HOWELL.
CONTROL MEANS FOR MOTION PICTURE PRINTING MACHINES.
APPLICATION FILED APR. 22, 1915.

1,225,335.

Patented May 8, 1917.
8 SHEETS—SHEET 4.

A. S. HOWELL.
CONTROL MEANS FOR MOTION PICTURE PRINTING MACHINES.
APPLICATION FILED APR. 22, 1915.

1,225,335.

Patented May 8, 1917.
8 SHEETS—SHEET 5.

Witnesses:

Inventor:
Albert S. Howell,
By Benjamin, Roodhouse & Lundy
Attys.

Fig. 10.

A. S. HOWELL.
CONTROL MEANS FOR MOTION PICTURE PRINTING MACHINES.
APPLICATION FILED APR. 22, 1915.

1,225,335.

Patented May 8, 1917.
8 SHEETS—SHEET 8.

*Fig. 13.*

Witnesses:

Inventor:
Albert S. Howell,
By Benjamin, Root Louse & Lynch
Attys.

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

CONTROL MEANS FOR MOTION-PICTURE-PRINTING MACHINES.

1,225,335.   Specification of Letters Patent.   Patented May 8, 1917.

Application filed April 22, 1915. Serial No. 23,020.

*To all whom it may concern:*

Be it known that I, ALBERT S. HOWELL, a citizen of the United States, residing at Chicago, in the county of Cook and State of Illinois, have invented certain new and useful Improvements in Control Means for Motion-Picture-Printing Machines, of which the following is a specification.

My present invention relates to motion picture printing machines and has special reference to the provision of suitable devices for automatically and manually controlling the operation of the mechanism. The special objects of my present invention are the provision of simple and effective mechanism automatically actuated by the negative film for stopping the feeding of the film through the machine and for excluding or cutting off the actinic rays of light from the film when the machine is stopped so that no sensitive film may be spoiled by the stopping of the machine, at the same time relieving the pressure which holds the negative and sensitive films in suitable contact for printing, and also indicating what, if any, light modification should be made when printing is to be resumed. Another object of my invention is to so construct the control mechanism that the control may also be had at will through a manual operation. A still further object of my invention is to provide mechanish which will automatically stop the film in a definite position with respect to the light or printing opening and a still further object of my invention is to provide a simple and effective means for controlling the intensity of the light in such a machine. A still further object of my invention is the provision of a simple control for accomplishing the rewinding of the negative film. And a still further object of my invention is the construction of the instrumentalities for accomplishing the above objects in a simple manner so as to economize in their manufacture, assembly and operation.

I prefer to accomplish the above objects by the means and in the manner hereinafter fully described and as more particularly pointed out in the claims, reference being had to the accompanying drawings forming a part of this specification in which.

In the drawings, similar reference characters are employed to indicate the same parts throughout the various views.

Figure 1:
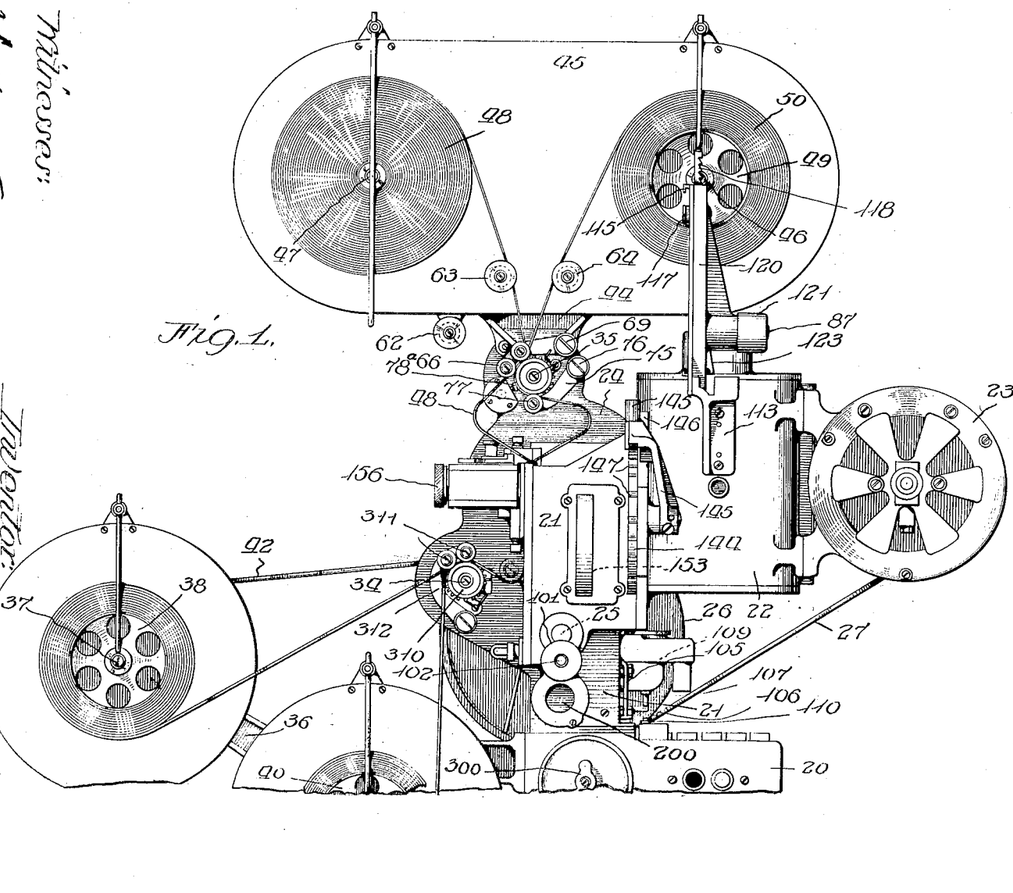
Figure 1 is a partial longitudinal side elevation of my improved cinematographic printing machine.
Figure 2:
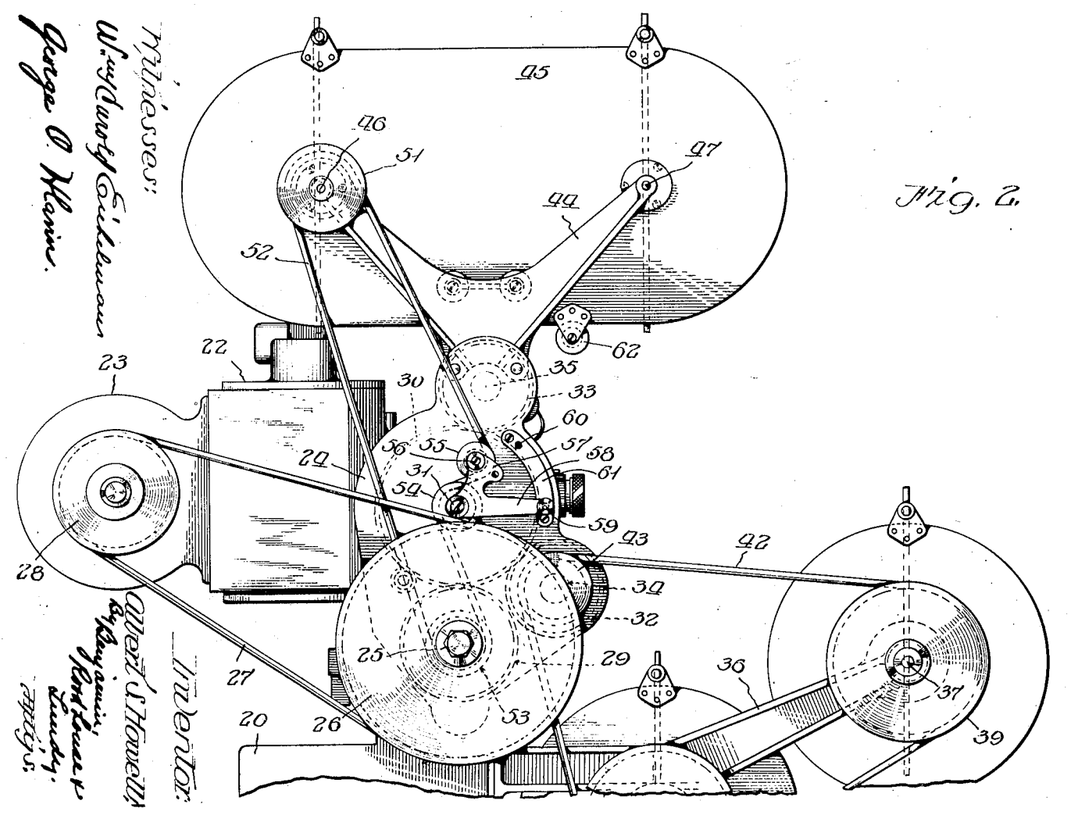
Fig. 2 is a partial longitudinal elevation of the opposite side of my apparatus illustrating the driving mechanism.

Referring first to Figs. 1 and 2 of the drawings, it will be observed my invention preferably comprises a suitable base 20 that is provided with a vertically disposed standard 21 adapted to support the operating mechanism of my device. Standard 21 is preferably hollow and of substantially rectangular cross-section for the purposes hereinafter described. A cylindrical lamphouse 22 is mounted upon the rear wall of said standard and provides a suitable mount for an electric motor 23 for generating the power whereby the mechanism is actuated.

Mounted upon one of the side walls of the standard 21 is an irregularly shaped plate 24 on which are secured divers parts of the mechanism and through which the main drive-shaft 25, which is journaled in said standard, extends. The outer end of the shaft 25 is provided with a pulley 26 which is driven by a belt 27 connecting the same with the pulley 28 on the shaft of the motor 23. Between the pulley and the bearings of shaft 25 the latter is provided with a gear 29 that meshes with a larger gear 30, the shaft 31 of which latter is above and has its axis in vertical alinement with the axis of shaft 25. Gear 30 meshes with two smaller gears 32 and 33, the shafts 34 and 35 whereof are likewise journaled in the standard 21 and extend through the plate 24.

A substantially horizontally disposed angular arm 36 is secured to and projects forwardly from the front wall of the base 20 and has a bearing in its outer end for a transverse stub-shaft 37 that is provided with a take-up spool 38 for the positive film upon one of its extended ends and has a grooved drive pulley 39 upon its opposite end. Intermediate its ends said arm 36 is provided with a bearing for another transverse stub-shaft, one extended end whereof carries a take-up spool 40 for the negative film and has a grooved drive pulley 41 mounted upon its opposite extended end. A belt 42 passes around pulleys 39 and 41 and connects and drives said pulleys from a smaller grooved pulley 43 carried by the outer ends of shaft 34, hereinbefore mentioned.

At or adjacent its upper end the standard 21 has a substantially V-shaped supporting bracket 44 secured thereto and to the ends of the arms of which a suitable elongated plates 45 is secured. Bearing bosses are provided in the ends of the arms of bracket 44 for mounting stub-shafts 46 and 47, the latter (47) whereof is preferably nonrotatable and is adapted to afford an arbor for the unexposed portion of a spool 48 of sensitized positive film, while the former stub-shaft (46) is preferably rotatable and is adapted to carry the spool 49 of a roll of negative film 50 that rotates therewith. Stub-shaft 46 extends laterally beyond its bearings opposite the spool 49 where it is provided with a fixed grooved pulley 51 driven by a belt 52 connecting the same with a pulley 53 fast on the main shaft 25. Belt 52 does not travel direct to the pulley 51 but in the path thereof are interposed idlers 54 and 55, the former of which rotates loosely upon the adjacent end of the shaft 31 and the latter (55) is journaled on a spindle 56 upon the movable arm 57 of a suitable belt tightener 58. This belt tightener is pivotally carried upon the end of shaft 31 and has an elongated arm 58 in the end of which is a stub 59 to engage sockets 60 in the ends of a segmental shaped stop-plate 61. Under the ordinary conditions, in other words, when the apparatus is employed as a printer, this arm 58 is in its uppermost position so that the belt 52 is loose and does not drive pulley 51, but when it is desired to rewind the negative film after the printing operation has been completed arm 57 is moved to its lowermost position to tighten the belt and after the film has been unthreaded from the usual feeding sprocket and other elements the same is passed over a small idle roller 62, mounted on the lower portion of plate 45, and secured to the spool 49 upon which it will be rewound. This rewinding mechanism may be readily and conveniently employed to rewind either the negative film from spool 40 or the positive film from its spool 38, as all that it is necessary to do is to unthread the film from the feeding sprockets, etc., and thread it directly over the roller 62 from its respective spool to the rewind spool 49, it, of course, being understood that all of the driving mechanism is first thrown out of operation by a suitable stop mechanism upon the main-shaft 25 hereafter to be described.

Figure 3:
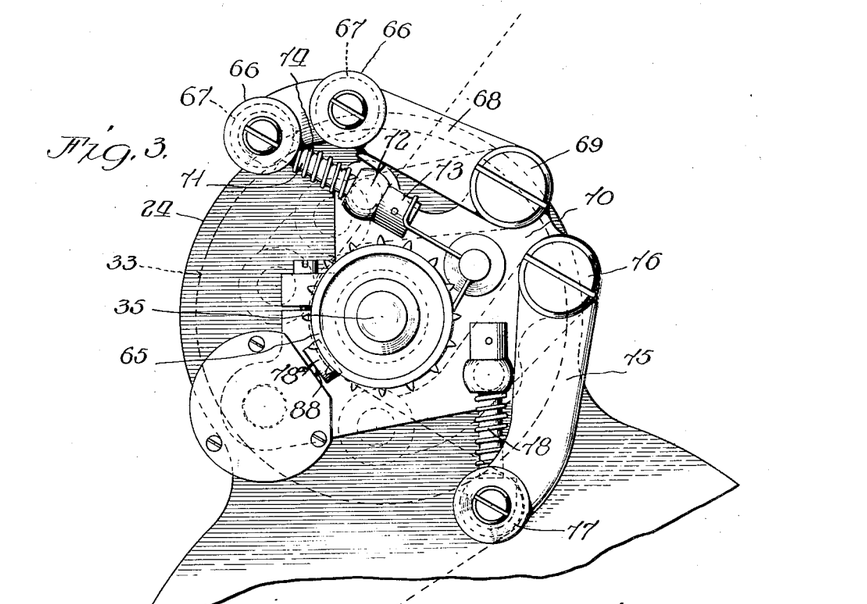
Fig. 3 is a fragmentary detail view of one of the film sprockets and the control mechanism drawn full size.
Figure 4:
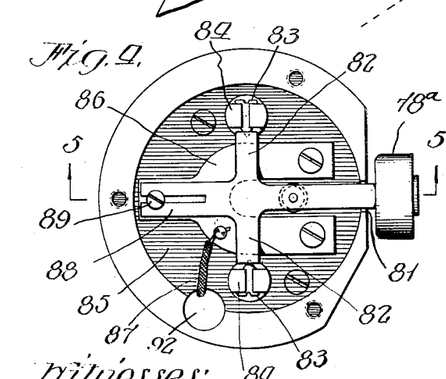
Fig. 4 is a detail view of the film control device with the cover removed and drawn to an enlarged scale.
Figure 5:
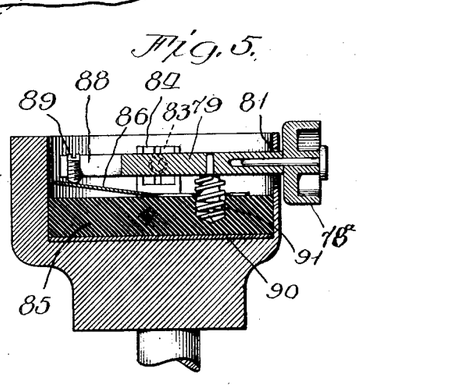
Fig. 5 is a sectional view of the film control device taken on line 5—5, of Fig. 4 looking in the direction of the arrows.

From their rolls the positive and negative films 48 and 50 are passed over guides or rollers 63 and 64 respectively from which they converge toward and engage feeding sprocket 65 mounted on the end of shaft 35 opposite gear 33. In order to retain the film upon the sprocket 65 and prevent its accidental removal therefrom I journaled a pair of suitable clamping rollers 66 in the outer movable portion of a swing lever 68, said rollers being grooved to accommodate the sprocket teeth by forming annular recesses 67 therein adjacent their ends. Lever 68 is pivotally mounted at one end on a stub 69 projecting laterally from a plate 70 secured to the outer face of the plate 24 (see Fig. 3) and is adapted to be retained in a raised position away from the sprocket by a pivoted rod 71 connected to its free end. A swivel bearing 72 is provided in which this rod 71 is slidably mounted so that the enlarged head 73 thereof will limit the movement of the lever in one direction while a coiled spring 74 surrounds said end between its bearing and its end connected with the lever 68. The swivel bearing 72 is so positioned that when the lever is moved past the dead-center, in other words, when the point of connection between rod 71 and lever 68 has passed beyond the line striking through the axes of swivel bearing 72 and stub 69, the spring will exert its force to move the lever to the limit of its swing in that direction. A lever 75 (similar to lever 68) is journaled on a stub 76 adjacent stub 69 and carries a grooved roller 77 on its outer movable end. A spring actuated rod 78 is connected to the outer end of lever 75 for the purpose of retaining said roller 77 in contact with the lower segment of sprocket 65, or away from the same, as desired. This lever and roller (75—77) perform the double function of retaining the ribbon of negative film in engagement with the sprocket through the lower segment of the latter and also of predetermining the length of loop necessary to provide for the proper feeding of the film to the aperture. This loop is readily made by placing the film over the roller 77 after it leaves sprocket 65 while the lever 75 is in its open or extended position, as shown in Fig. 3 of the drawings, and then threading the film through the film passage in front of the aperture of the machine. The shuttle or other devices for moving the film past the aperture is synchronized with the other parts of the mechanism so that the teeth thereof are adapted to stop always at the same point as will hereinafter more fully appear, and, therefore, after the loop has been formed and the film passage gate closed to secure the film therein, the lever 75 is swung upwardly against the sprocket 65, as shown in dotted lines, leaving a loop of film of a predetermined length between the sprocket and the aperture of the apparatus.

Figures 6, 7:
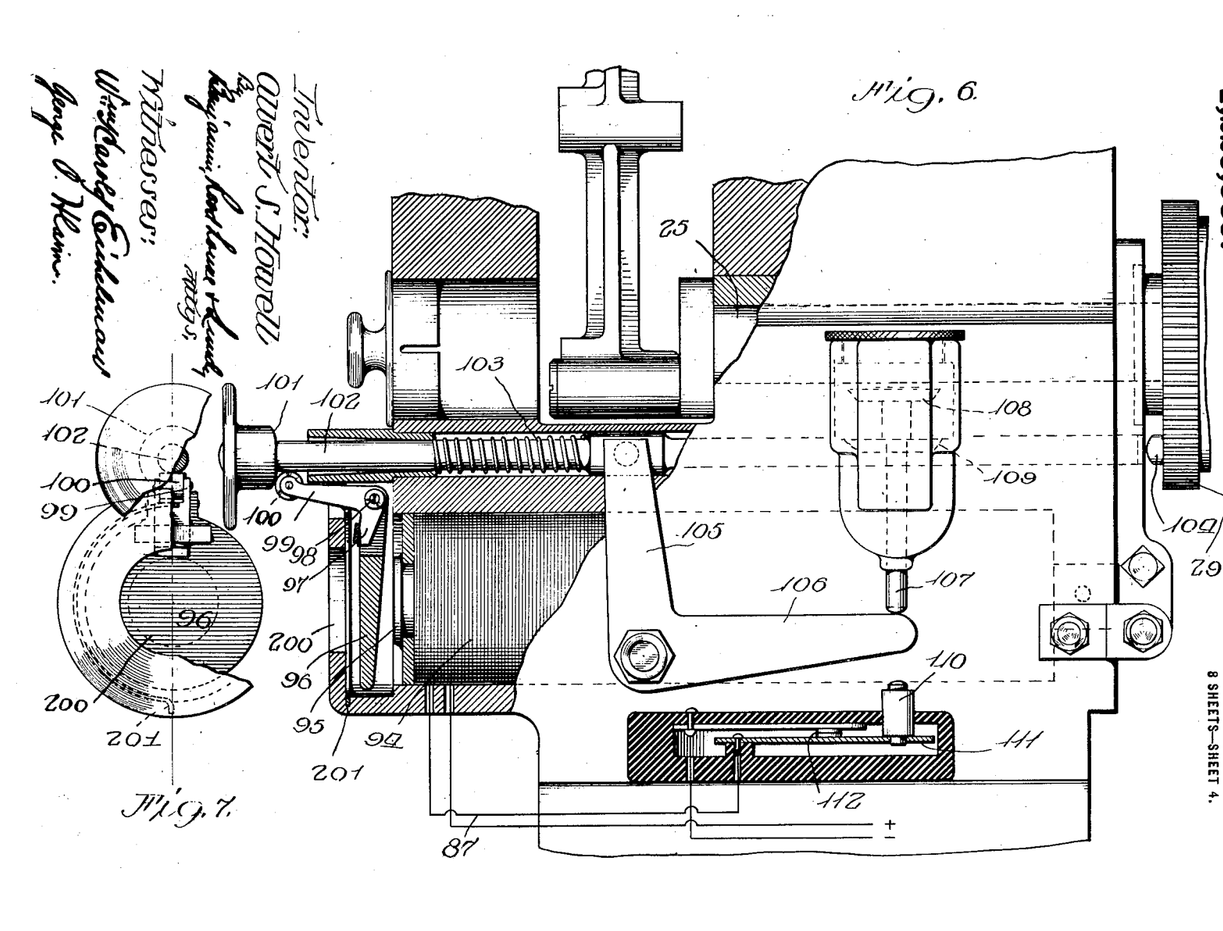
Fig. 6 is a fragmentary elevation of the stop mechanism drawn full size and a portion whereof is illustrated in section.
Fig. 7 is a fragmentary broken-away front or end elevation of a portion of the device illustrated in Fig. 6.

As has been alluded to heretofore one of the objects of my invention is the provision of means whereby the film feeding mechanism may be stopped at predetermined points for the purpose of light passing through the aperture. It will be seen by reference to Fig. 1 of the drawings the positive film 48 leaves the sprocket 65 tangentially after passing rollers 66 and forms a loop extended in the opposite direction to the loop in the negative film while the latter is adapted to continue in engagement with sprocket 65 until it has passed roller 77. This secures a separation of said positive and negative films prior to the latter leaving the sprocket. The predetermined points of stoppage are indicated upon the negative film by means of notches or marginal recesses cut therein which do not in any manner interfere with the operation of nor destroy the integrity of said negative film. The stop mechanism which is adapted to be operated by these notches preferably comprises a suitable roller 78ª mounted upon the outer end of the elongated arm 79 of a substantially cross-shaped lever. A cylindrical shaped box 80 is provided adjacent sprocket 65 and said lever is fulcrumed therein so that the arm 79 carrying roller 78ª extends through a slot 81 in the wall thereof and positions the roller in contact with the margin of the negative film about midway between retaining rollers 66 and 77. The shorter lateral arms 82 of the lever are engaged by the points of conical-shaped bolts 83 mounted in suitable split bearing lugs 84 arising from a disk of insulating material 85 disposed in the bottom of the box 80. A substantially Y-shaped spring contact plate 86 is secured to the insulating disk and has one of the wires of a suitable battery circuit 87 connected thereto, while the arm 88 of said lever opposite the roller 78ª is provided with an adjustable screw 89 tapped therethrough and adapted to make contact with the up-turned spring portion of the Y-shaped plate. In order to retain the roller normally pressed toward and in engagement with the margin of the negative film I prefer to interpose a coiled expansion spring 90 between the lever arm 79 and the insulation disk 85 and seat one end of said spring in a socket 91 made in said disk. The other wire of the battery circuit 87 is connected to one of the bearing lugs 84 adjacent an outlet opening 92 made in the bottom of said box 80. The circuit 87 leads from the battery 93 (Fig. 13) to a solenoid 94, which latter is energized thereby whereupon the core 95 thereof attracts a circular metallic disk 96, pivotally mounted adjacent the same. The movement of said disk 96 is adapted to release a suitable stop mechanism preferably similar to that illustrated and described in an application for Letters Patent of the United States for "Stop and recoil mechanism for motion picture apparatus" filed by me February 13th, 1915, Serial Number 7,932 (series of 1915), which mechanism need not be described in detail herein. Suffice it to state, however, that said disk engages a lateral arm 97 of a bell crank lever mounted upon the pivot 98 carrying said disk, the longer arm 99 of said bell crank lever being provided with a roller 100 upon its outer end that is adapted to engage a shoulder 101 upon the adjacent end of a longitudinally reciprocable rod 102 mounted above said solenoid 94. Rod 102 extends transversely through the walls of the standard 21 of the apparatus and is kept normally pressed toward the end of its guideway opposite the disk 96 by an expansion spring 103 surrounding the same inside said standard. Upon the release of the plunger by the bell crank and disk the opposite end thereof is adapted to be moved through its bearings into the path of a lateral stud 104 projecting inwardly from the gear 29 thereby instantaneously stopping the rotation thereof and consequently all other parts actuated thereby. The motor will continue to run owing to the provision of a suitable friction clutch mechanism (not shown) operatively connecting the gear 29 with the drive pulley 26 substantially as illustrated and described in my aforesaid co-pending application, Serial No. 7,932. The end of the casing in which the electromagnet 90 is mounted and directly in front of the disk 96 is provided with an opening 200 which permits manual access to the disk 96 so that the stop mechansm may be thrown into operation at will and independently of the film control devices heretofore described. After the stop mechanism has been operated to stop the machine either through the film control or manually it may be released to start the mechanism by pulling out the rod 102 through the instrumentality of the knob 101 until roller 100 again engages the base of said knob. It will be seen, especially by reference to Fig. 7, that the semi-circular spring 201 presses the arm 99 and roller 100 normally upwardly into engagement with the base of knob 101.

A suitable bell crank is conveniently pivoted upon the wall of the standard, one arm 105 of which is operatively connected with the reciprocable rod 102 while the opposite arm 106 supports the stem 107 of the valve 108 controlling the air inlet 109 to the lamp chamber. Upon the reciprocation of the rod 102 the arm 106 of the bell crank will be lowered permitting the valve 108 to seat on the opening 109 and thereby cut off the air supply. So soon as arm 106 reaches the limit of its downward movement it comes into engagement with an insulated push button 110 carried by one of the contact plates 111 of a suitable circuit breaker 112 interposed in the battery circuit 87 thereby cutting out said circuit and rendering the element inoperative for the purpose of economizing battery current.

Figure 8:
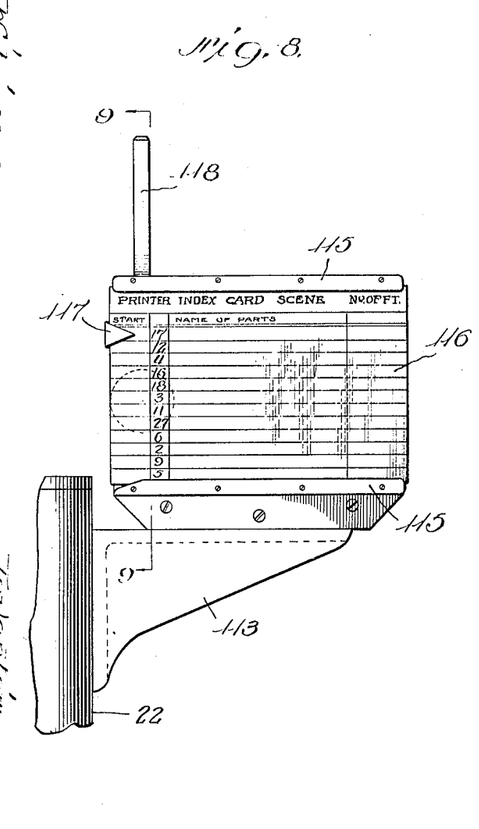
Fig. 8 is a detail view in front elevation of the indicating device for changing the light.
Figure 9:
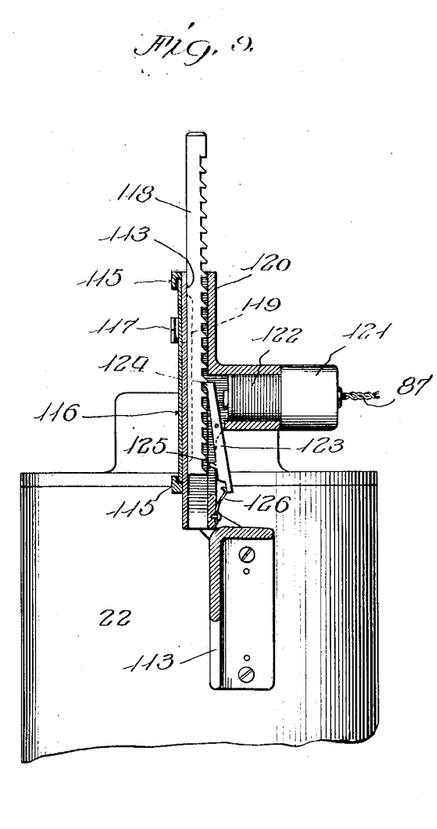
Fig. 9 is a sectional detail of said indicating device taken on line 9—9, Fig. 8, and looking in the direction of the arrows.

Secured to and projecting laterally from the wall of the lamp house 22 is a suitable horizontally disposed bracket 113 adapted to support a card holder and automatic light indicator as will be observed by particular reference to Figs. 8 and 9 of the drawings. The card holder comprises a vertically disposed plate 114 suitably mounted on said bracket 113 and providing a back for the card holder. Parallel horizontal guides 115 are secured to the upper and lower edges of said plate 114 into which a suitable index card 116 is slidably and removably inserted. This index card bears upon its face in sequence indicia indicating the successive light conditions which are requisite in printing the scenes so that the indicator hereafter described will not only show when a change is to be made but the nature of the change that should be made.

An automatically movable indicator 117 is provided that is secured to and projects from a ratchet bar 118 and extends through an elongated slot 119 in the side of the guide 120 for said bar. This guide 120 is preferably mounted upon the rear face of card plate 114 and is provided with tubular embossment 121 or housing for a small electro-magnet 122 interposed in the battery circuit 87.

An escapement pawl 123 is pivoted intermediate its ends in the guide 120 and is pivoted with a lateral tooth 124 at its upper end and a similar tooth 125 adjacent its lower end. The upper tooth 124 of said pawl is kept normally in engagement with the teeth on said rack bar 118 by a suitable spring 126 that presses against the lower end of said pawl. The upper portion of pawl is positioned adjacent the core of electro-magnet 122 so that when the latter is energized said pawl will be attracted and drawn thereto thus disengaging tooth 124 from the rack and permitting the same to drop and be caught or held by the lower tooth 125. This operation is repeated as often as the notches in the negative film cause the energizing of the battery circuit 87 through the control contact mechanism contained in the box 80. It will be observed that this operation takes place simultaneously with the stoppage of the actuating mechanism through the medium of the electro-magnet 94 hereinbefore described, and it is therefore possible for a single attendant to take charge of several printing machines at the same time and as each stops he may adjust the light to the intensity respectively indicated on the index card and again start the machine.

Figure 10:
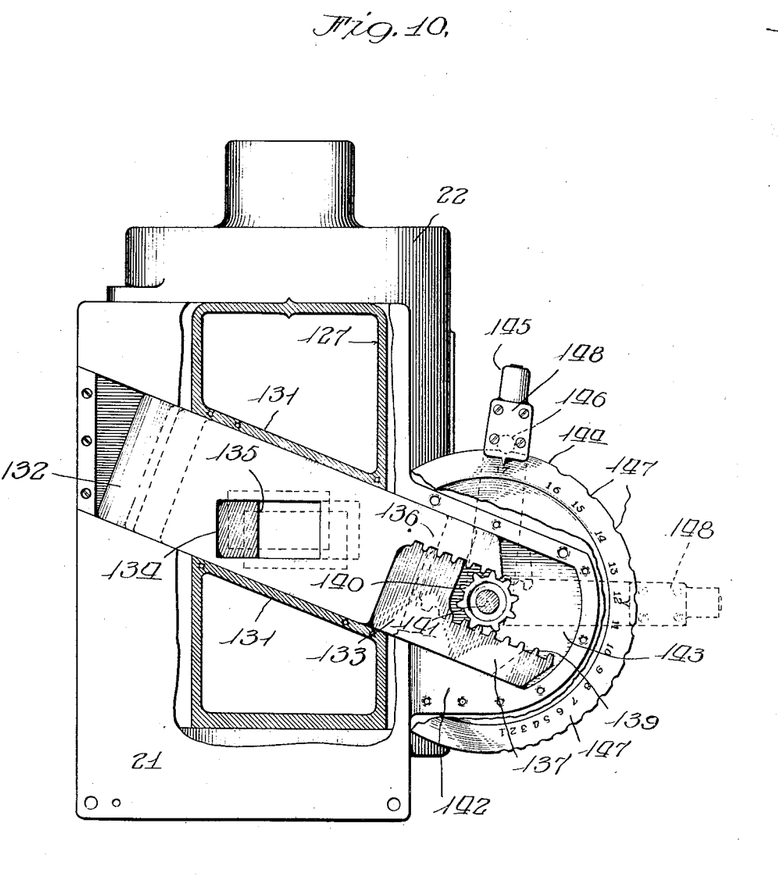
Fig. 10 is a sectional detail showing the light regulating plates, taken on line 10—10, Fig. 11 and looking in the direction of the arrows.
Figure 11:
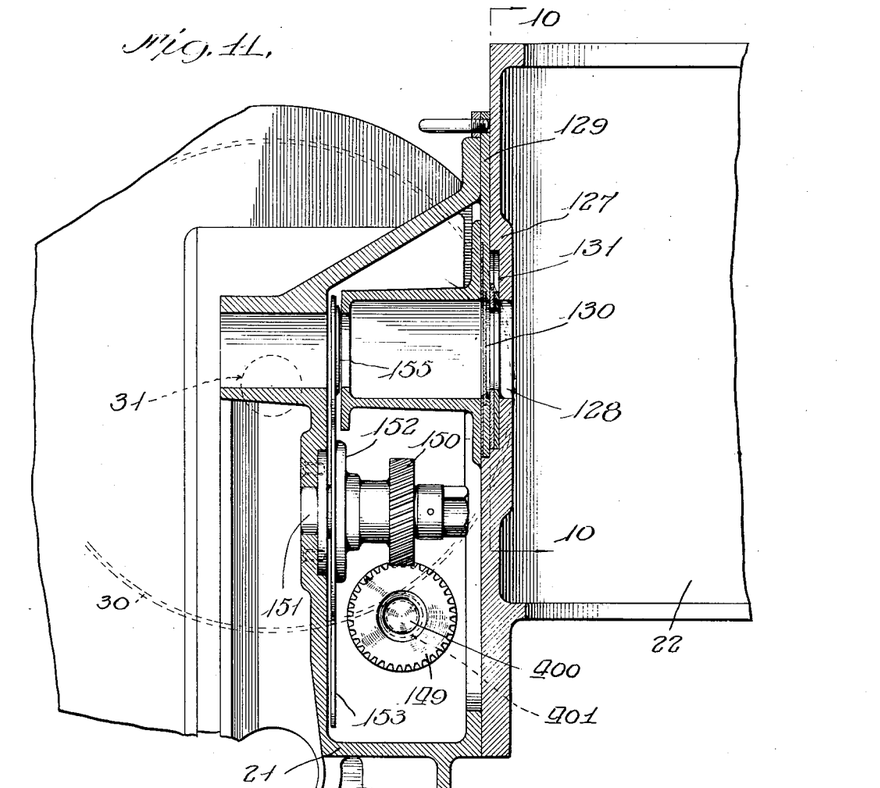
Fig. 11 is a vertical longitudinal section taken axially through the aperture element, portions of the surrounding mechanism being omitted for clearness.

The means for adjusting the quantity of light passing through the aperture preferably comprises the structure illustrated in detail in Figs. 10 and 11 of the drawings, wherein it will be observed the lamp house is provided with vertically elongated embossment 127 through which an opening 128 of suitable dimensions is made in alinement with the aperture element of the machine. A metal slide 129 having an opening therein covered by a ground glass 130 is disposed in front of this opening for the purpose of diffusing the light waves radiating from the source of illumination within the lamp house 22. A guideway 131 is formed across said embossment by suitable inclined shoulders or flanges that are disposed parallel to each other. Diaphragm plates 132 and 133 disposed one in front of the other and are movably mounted in said guideway and are respectively provided with substantially rectangular shaped elongated openings 134 and 135 and are so arranged that their edges or peripheries are in horizontal and vertical planes, and register with each other to a greater or less extent. The adjustment of said diaphragm plates is preferably accomplished by providing the lower ends thereof with suitable extensions 136 and 137, the former projecting from the upper edge of diaphragm 132 and the latter projecting from the lower edge of diaphragm 133 as shown in Fig. 10 of the drawings. The lower and upper edges respectively of these extensions 136 and 137 are provided with racks 138 and 139 so that they may mesh with and be actuated by a single pinion 140 the rotation of which latter will move the diaphragm plates 132 and 133 in opposite directions, as shown in dotted lines. Pinion 140 is mounted upon the end of a suitable arbor 141 journaled in a segmental shaped plate 142 secured to, and projecting laterally from the embossment 127 of the lamp house 22 and is recessed at 143 to accommodate the diaphragm plates 132 and 133 that slide therein. An outer segmental plate 144 covers the recess and prevents the lateral displacement of the diaphragm plates and pinion 140.

The arbor 141 of the pinion extends rearwardly beyond its bearings where it has a suitable operating handle 145 connected thereto the upper portion of which inclines toward and is adapted to engage the edge of segmental plate 144, and said upper portion is provided with a spring pressed plunger or pawl 146 adapted to engage suitable concave recesses or notches 147 made transversely across the peripheral edge of said segmental plate 144. These notches are identified by numerals "1" to "17" respectively as illustrated in Fig. 10 of the drawings which indicate to the operator the respective size of the opening and thereby the quantity of light passing through the aperture. A plate 148 is provided with a suitable arrow or pointer which is preferably screwed onto the handle 145 in order to conveniently point to and indicate the position of the diaphragm plates.

Thus it will be observed that by swinging the handle around the segmental plate the diaphragm plates are moved in opposite directions thus relatively increasing or diminishing the size of the continuous opening through the diaphragms whereby the quantity of light passing therethrough is regulated to a nicety and the point at which the handle is stopped by the operator is determined by reference to the index card 116 (Fig. 8) each time the machine is stopped.

It is extremely advantageous in a machine of this character to make provision during the stoppage thereof, for excluding the actinic waves of light from the film in order that no sensitized film may be spoiled thereby and also to prevent the film igniting. I prefer to take care of this contingency by the employment of a suitable shutter mechanism preferably of the form illustrated in Figs. 11 and 12 of the drawings.

Figure 12:
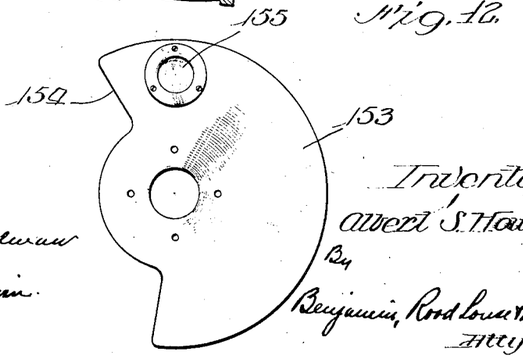
Fig. 12 is a front elevation of the shutter used in connection with the mechanism shown in Fig. 11.

Shaft 31 which is driven by the mainshaft 25 through gears 29 and 30, preferably extends into the standard where it is provided with a worm gear 149 that meshes with another worm gear 150 mounted on a stub shaft or arbor 151 secured to and projecting inwardly from the wall of the standard in a horizontal plane above said shaft 31 and at substantially right angles thereto. The hub of worm gear 150 is provided with a flared enlargement 152 at its end opposite the gear to which a suitable disk shaped shutter 153 is secured and rotatable therewith. This shutter has cut therefrom a portion at 154 which is slightly more than one-third its perimeter and adjacent one of the edges from which the portion is cut is a small circular window that is covered with a red or ruby glass 155. Said shutter is positioned so that it will rotate through the path of light between the diaphragm plates and the aperture of the apparatus, and when it is rotated the cutout portion 154 will permit of the unobstructed passage of light waves and the remaining portion will shut off the light to the aperture in front of which latter the film is positioned. The timing of the shutter is so adjusted that it cuts off the light through the aperture during the intermittent periods of motion of the film and permits light to pass to the film when the latter is momentarily stopped. This disposition of the window is such that whenever the battery circuit is in operation to throw in the stop mechanism the window will come to rest and stop in front of the light thereby permitting the operator to inspect the same through the sight tube 156 in front of the aperture and at the same time prevent the burning or spoiling of the sensitized film.

Figure 13:
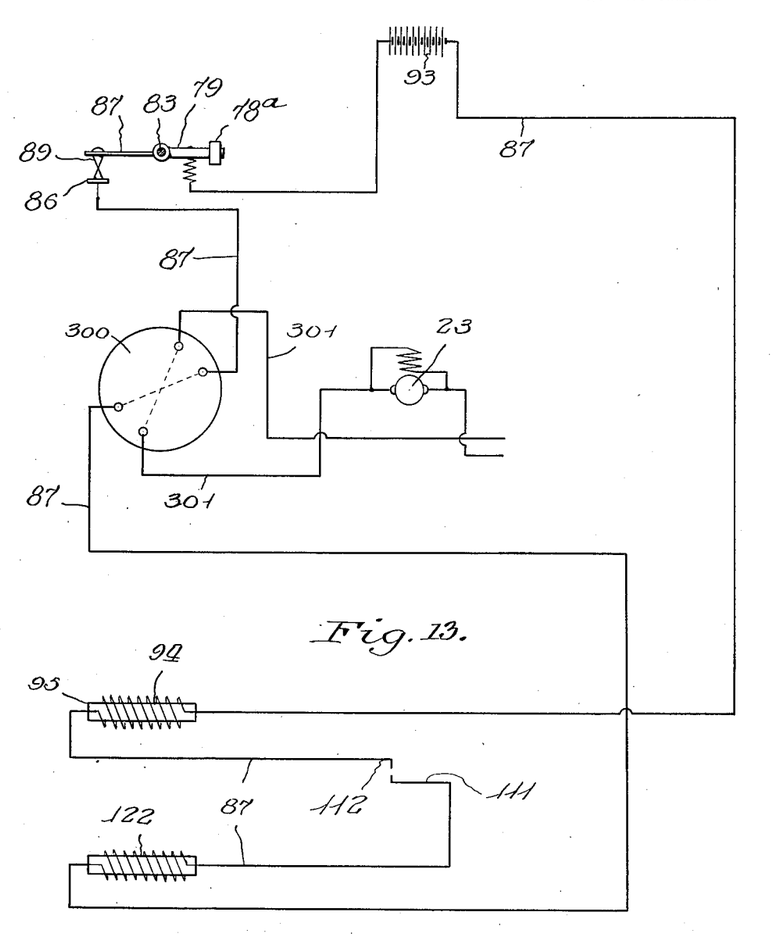
Fig. 13 is a schematic view of the electrical elements and parts employed in carrying out my invention.

In Fig. 13 I have illustrated schematically or diagrammatically the electrical elements of my invention. As heretofore explained a battery 93 may be conveniently employed for energizing the various control features. The circuit 87 from the battery runs through the circuit closing arm 79 which is actuated by the film through the contacts 89 and 86 to a four-point switch 300 and from this switch the circuit runs through the electromagnet 122 adapted to operate the indicator mechanism for the index-card, and from thence the circuit proceeds through the circuit-breaker 112 to the electro-magnet 94 which actuates the stop mechanism, and from this point the circuit returns to the battery 93. The motor 23 which furnishes power for operating the machine may conveniently be connected in circuit 301 with the opposite points of the four-point switch which have not already been employed in the battery circuit. This arrangement permits both the power and control circuit being simultaneously rendered operative by a single turn of the same switch, and, as heretofore explained, the interposition of the circuit-breaker in the battery or control circuit, which circuit-breaker is adapted to be mechanically operated, will prevent a useless consumption of the battery circuit.

Below the sight tube 156 I provide a film sprocket 310 on the end of shaft 34 and over which the positive and negative films pass after transit through the film passage past the aperture. Suitable retaining rollers 311 are mounted upon a pivoted arm 312 adapted to be swung toward and away from said sprocket, and after leaving said sprocket the films pass to their respective take up spools 38 and 40 to be wound thereon.

In the above description and the drawings forming a part thereof I have disclosed numerous specific devices for carrying out the objects of my invention which, of course, may be readily modified or refined for the purpose of adapting the mechanism to divers types of machines, all of which will be obvious to others skilled in the art of cinematography. I desire it understood therefore that all such modifications or refinements are contemplated within the scope of my invention as expressed in the appended claims, and I do not therein limit myself to any particular type of apparatus to which my invention is applicable.

What I claim as new is:

1. In motion picture apparatus, a movable member adapted to contact a film, means for pressing one end of said member toward the film, an electrical contact device operable by the movement of said member, an electro-magnet in circuit through said contact, an escapement actuated by said electro-magnet, a ratchet bar coacting with said escapement, an indicator carried by said ratchet bar, and an index card-holder disposed in cooperative relation with said indicator.

2. In motion picture apparatus, a movable member adapted to contact a film, means for pressing one end of said member toward the film, an electrical contact device operable by the movement of said member, an electro-magnet in circuit through said contact, an armature depending within the influences of said magnet, means coacting with said armature for controlling mechanism for stopping the operation of said machine, and a circuit breaking device actuated by said stop mechanism for interrupting the electro-magnetic circuit.

3. In motion picture apparatus, a movable member adapted to contact a film, means for pressing one end of said member toward the film, an electrical contact device operable by the movement of said member, an electro-magnet in circuit through said contact, an armature depending within the influence of said magnet, means coacting with said armature for controlling mechanism for stopping the operation of said machine, a valve controlling the flow of air through said machine, and a movable member actuated by said stop mechanism adapted to operate said valve.

4. In motion picture apparatus, a movable member adapted to contact a film, means for pressing one end of said member toward the film, an electrical contact device operable by the movement of said member, an electro-magnet in circuit through said contact, an armature depending within the influence of said magnet, means coacting with said armature for controlling mechanism for stopping the operation of said machine, a valve controlling the flow of air through said machine, a circuit breaker in the circuit of said electro-magnet, and a movable member actuated by said stop mechanism and adapted to control the movement of said valve and coact with said circuit-breaker.

5. In motion picture apparatus, a film actuating mechanism including a main drive gear, means for stopping said mechanism, comprising a rod adapted to be moved into the path of said gear, mechanism for retaining said rod in inoperative position, an armature coacting with said retaining mechanism, and an electro-magnet disposed in coactive relation with said armature, and means for controlling the circuit through said magnet coacting with the film, actuated by said film actuating mechanism.

6. In motion picture apparatus, means for actuating the film, a magnetic circuit, devices actuated by the film for energizing said circuit, a magnet in said circuit, an escapement actuated by said magnet, a ratchet-bar coacting with said escapement, and an indicator carried by said ratchet-bar.

7. In motion picture apparatus, a film actuating mechanism, means for stopping said mechanism, devices actuated by the film for operating said stop mechanism, an electric circuit in which said devices are interposed, and a circuit breaker in said circuit actuated by said stop mechanism.

8. In motion picture apparatus, a movable member normally in contact with the film, an electro-magnet and circuit energized by the movement of said member, a drive-gear, a reciprocal rod adapted to be moved into the path of said gear, a lever adapted to engage said rod and normally retain the same out of engagement with said gear, and an armature on said lever and disposed within the influence of said magnet.

9. In motion picture apparatus, a movable member normally in contact with the film, an electro-magnet and circuit energized by the movement of said member, a drive-gear, a reciprocal rod adapted to be moved into the path of said gear, a bell-crank one arm of which is adapted to engage said rod and normally retain the same out of engagement with said gear, and an armature on the other arm of said lever and disposed within the influence of said magnet.

10. In motion picture apparatus, a movable member normally in contact with the film, an electro-magnet and circuit energized by the movement of said member, a drive-gear, a reciprocable rod adapted to be moved into the path of said gear, a lever adapted to engage said rod and normally retain the same out of engagement with said gear, an armature on said lever and disposed within the influence of said magnet, and a circuit breaker interposed in said circuit and actuated by the movement of said reciprocable rod.

11. In motion picture apparatus, a movable member normally in contact with the film, an electro-magnet and circuit energized by the movement of said member, a drive-gear, a reciprocable rod adapted to be moved into the path of said gear, a bell-crank one arm of which is adapted to engage said rod and normally retain the same out of engagement with said gear, an armature on the other arm of said lever and disposed within the influence of said magnet, and a circuit breaker interposed in said circuit and actuated by the movement of said reciprocable rod.

12. In motion picture apparatus, a film actuating mechanism, an electro-magnet, circuit closing mechanism comprising a pivoted arm, a roller carried thereby and adapted to be yieldingly held in the path of film actuated by the film actuating mechanism, a contact carried by said arm independently of said roller, and an electric circuit through said electro-magnet in which said pivoted arm and contact are interposed.

13. In motion picture apparatus, an aperture element, mechanism for moving film in front of said aperture element, a shutter interposed therein consisting of a disk from which a portion has been cut away, said shutter provided with an opening, means for actuating said shutter synchronized with said film actuating mechanism, and devices for stopping said mechanism synchronized therewith so as to bring said opening to rest in registry with said aperture element.

14. In motion picture apparatus, an aperture element, mechanism for moving film in front of said aperture element, a rotatable shutter interposed therein consisting of a disk from which a portion has been cut away, said shutter provided with an opening, means for rotating said shutter consisting of gears in mesh with and driven by said film actuating mechanism, and devices for stopping said mechanism synchronized therewith so as to bring said opening to rest in registry with said aperture element.

15. In motion picture apparatus, an aperture element, mechanism for moving film in front of said aperture element, a rotatable shutter interposed therein consisting of a disk from which a portion has been cut away, said shutter provided with an opening, means for rotating said shutter consisting of a shaft driven by said film actuating mechanism, an arbor on which said disk is mounted, gears connecting said shaft and arbor, and devices for stopping said mechanism synchronized therewith so as to bring said opening to rest in registry with said aperture element.

16. In motion picture apparatus, an aperture element, mechanism for moving film in front of said aperture element, a rotatable shutter interposed therein consisting of a disk from which a portion has been cut away, said shutter provided with an opening, means for rotating said shutter consisting of a shaft driven by said film actuating mechanism, an arbor disposed at an angle to said shaft and upon which said disk is mounted, gears connecting said shaft and arbor, and devices for stopping said mechanism synchronized therewith so as to bring said opening to rest in registry with said aperture element.

17. In motion picture apparatus, an aperture element, mechanism for moving film in front of said aperture element, a rotatable shutter interposed therein consisting of a disk from which a portion has been cut away, said shutter provided with an opening, means for rotating said shutter consisting of a shaft journaled in the standard of said machine and driven by said film actuating mechanism, a gear upon the inner end of said shaft, an arbor upon which said disk is mounted, a gear on said arbor in mesh with said first-mentioned gear, and devices for stopping said mechanism synchronized therewith so as to bring said arbor to rest in a position whereby the opening in said disk will be in registry with the aperture element.

18. In motion picture apparatus, an aperture element, means for moving film in front of said aperture element, devices for stopping said film-moving means, and a device movable between the film and aperture element provided with an opening, the movement of which device is synchronized with said film-moving mechanism so as to bring said opening in registry with said aperture element during the stoppage of the film.

19. In motion picture apparatus, an aperture element, means for moving the film in front of said aperture element, means for stopping said film-moving means, and a device movable between the film and aperture element provided with an opening that is covered with a screen adapted to exclude actinic rays of light from the film, the movement of said device being synchronized with said film-moving mechanism so as to bring said opening in registry with said aperture element during the stoppage of the film.

20. In motion picture apparatus, an aperture element, means for controlling the passage of film past said aperture element, and a light shutter interposed between the film and aperture element a portion of which is adapted to filter the light passing therethrough, means for synchronizing the movement of said shutter with the movement of said film-actuating means whereby the light-filtering portion of the shutter will be brought into registry with said aperture element during the stoppage of the film in its passage before said aperture element.

21. A motion picture machine having a light aperture therein, means for moving film past said aperture, a light unit positioned to project its rays through said aperture upon the film, a light shutter positioned intermediate said light and the film, a light filtering element adapted to be positioned intermediate said light and film when said light shutter comes to rest, and means for coördinating the interposition of said filtering element with said shutter actuation.

In witness whereof, I have hereunto set my hand and seal, this 19 day of April, 1915.

ALBERT S. HOWELL. [L. S.]

Witnesses:
E. K. LUNDY, Jr.,
WM. HAROLD EICHELMAN.